United States Patent
Kubota et al.

(10) Patent No.: US 12,374,677 B2
(45) Date of Patent: Jul. 29, 2025

(54) COATED ACTIVE MATERIAL PRODUCTION METHOD AND COATED ACTIVE MATERIAL

(71) Applicant: TOYOTA JIDOSHA KABUSHIKI KAISHA, Toyota (JP)

(72) Inventors: Masaru Kubota, Okazaki (JP); Kazuki Muraishi, Toyota (JP); Yuki Ishigaki, Nisshin (JP); Masanori Kitayoshi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 17/470,319

(22) Filed: Sep. 9, 2021

(65) Prior Publication Data

US 2022/0085347 A1 Mar. 17, 2022

(30) Foreign Application Priority Data

Sep. 11, 2020 (JP) ................. 2020-152758
Aug. 6, 2021 (JP) ................. 2021-130363

(51) Int. Cl.
| | |
|---|---|
| *H01M 4/04* | (2006.01) |
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC ....... *H01M 4/0419* (2013.01); *H01M 4/0471* (2013.01); *H01M 4/366* (2013.01); *H01M 4/505* (2013.01); *H01M 4/525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2015/0287985 A1 | 10/2015 | Miki | |
| 2016/0268595 A1* | 9/2016 | Miki | ............ H01M 4/366 |
| 2017/0077489 A1* | 3/2017 | Uchiyama | ............ C01G 53/50 |
| 2017/0162856 A1 | 6/2017 | Uchiyama | |
| 2017/0256777 A1 | 9/2017 | Akikusa et al. | |
| 2020/0067093 A1 | 2/2020 | Yamaya et al. | |
| 2022/0149354 A1 | 5/2022 | Omura et al. | |

FOREIGN PATENT DOCUMENTS

| | | |
|---|---|---|
| CN | 104979532 A | 10/2015 |
| CN | 106848213 A | 6/2017 |
| JP | H10259993 A | 9/1998 |
| JP | 2014-229567 A | 12/2014 |
| JP | 2016-058257 A | 4/2016 |
| JP | 2016072072 A | 5/2016 |
| JP | 6098568 B2 | 3/2017 |
| JP | 2017-103182 A | 6/2017 |
| JP | 6269645 B2 | 1/2018 |

(Continued)

*Primary Examiner* — Jonathan Crepeau
(74) *Attorney, Agent, or Firm* — Dinsmore & Shohl LLP

(57) ABSTRACT

A method for producing a coated active material includes dropletizing a slurry to obtain slurry droplets wherein the slurry contains an active material and a coating liquid, gas-flow drying the slurry droplets in a heating gas to obtain a precursor, and firing the precursor.

3 Claims, 7 Drawing Sheets

(56) References Cited

FOREIGN PATENT DOCUMENTS

| JP | 2019-003801 A | 1/2019 |
| JP | 6627932 B1 | 1/2020 |
| KR | 10-2016-0110045 A | 9/2016 |
| WO | 2013/027432 A1 | 2/2013 |
| WO | 2020/175506 A1 | 9/2020 |

\* cited by examiner

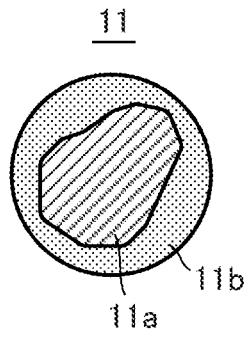 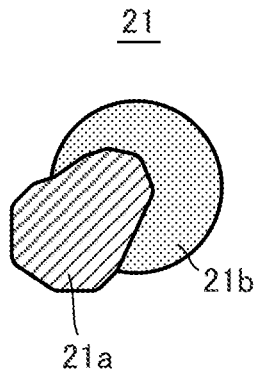 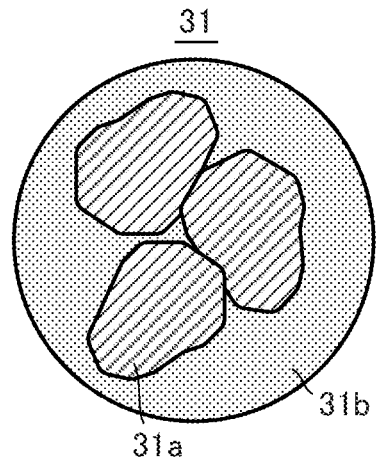
FIG. 2A    FIG. 2B    FIG. 2C
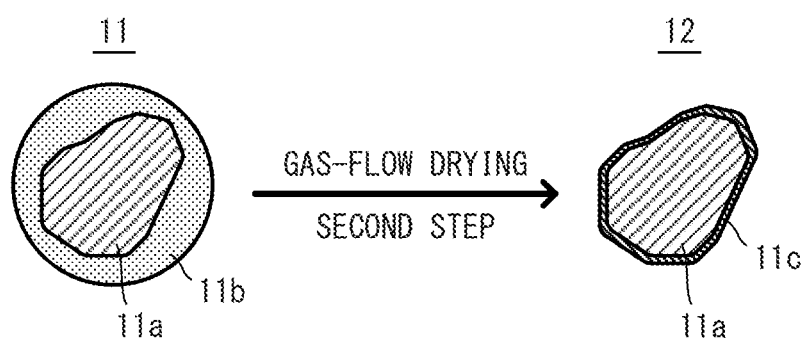
FIG. 3

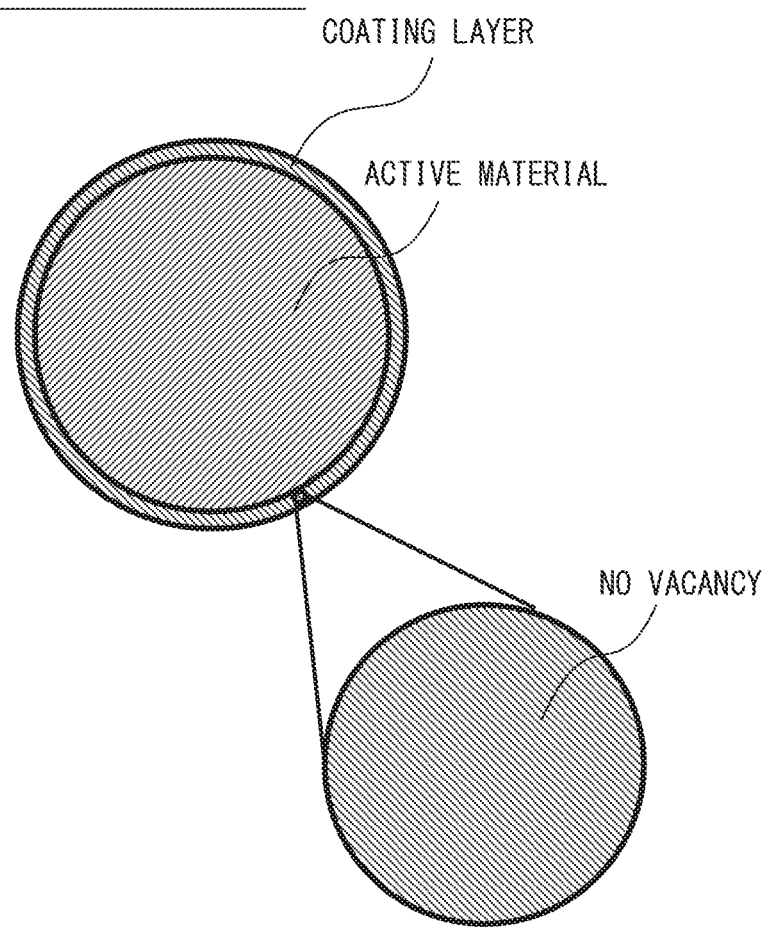

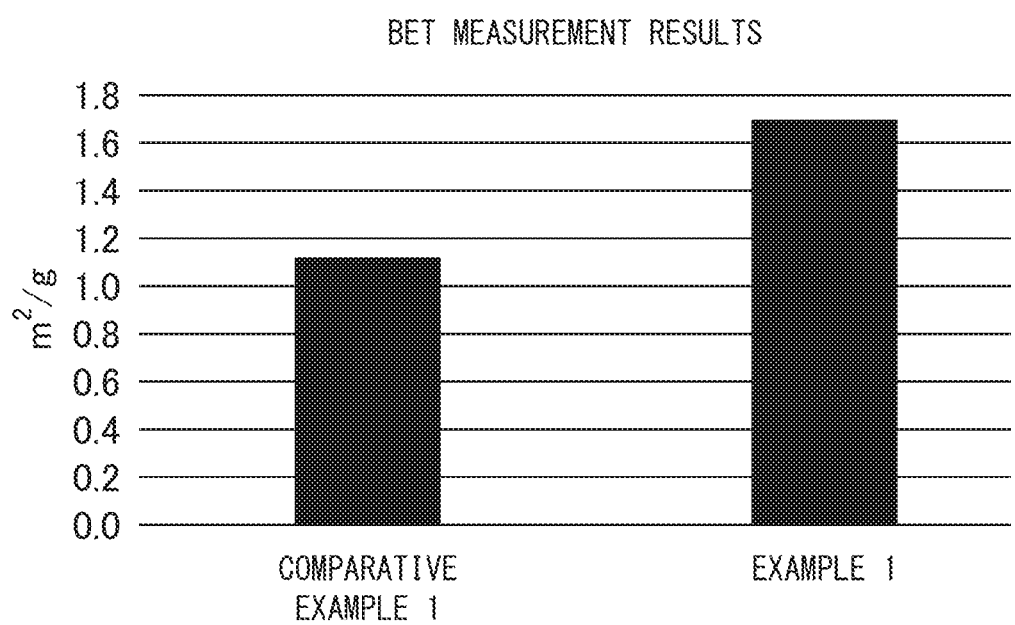

COATED ACTIVE MATERIAL PRODUCTION METHOD AND COATED ACTIVE MATERIAL

CROSS-REFERENCE TO RELATED APPLICATION

This application claims priorities to Japanese Patent Application No. 2020-152758 filed on Sep. 11, 2020 and Japanese Patent Application No. 2021-130363 filed on Aug. 6, 2021, incorporated herein by reference in their entireties.

TECHNICAL FIELD

The present disclosure relates to a coated active material and a method for producing the coated active material.

BACKGROUND

Patent Literature 1 discloses a method for producing an active material composite (coated active material), wherein a specific coating liquid is sprayed onto and dried on the surface of an active material using a tumbling fluidized bed coating device, and then fired.

CITATION LIST

Patent Literature

[PTL 1] Japanese Patent No. 6269645

SUMMARY

Technical Problem

In the production method disclosed in Patent Literature 1, in order to suppress aggregation of the active material, it is necessary that the spraying speed of the coating liquid be decreased. As a result, there is a problem in that the time necessary for producing the coated active material is extended.

Solution to Problem

The present disclosure provides, as one means for solving the above problem: a method for producing a coated active material, the method comprising: dropletizing a slurry to obtain slurry droplets wherein the slurry contains an active material and a coating liquid, gas-flow drying the slurry droplets in a heating gas to obtain a precursor, and firing the precursor.

In the method of the present disclosure, the slurry may be dropletized by spraying.

In the method of the present disclosure, the coating liquid may contain a lithium source and a niobium source.

In the method of the present disclosure, the niobium source may contain a niobium peroxo complex.

In the method of the present disclosure, the temperature of the heating gas may be 100° C. or higher.

The coated active material to be produced by the method of the present disclosure may have, for example, the following structure. Specifically, the coated active material may have an active material and a coating layer covering at least a part of the surface of the active material, and the coating layer may have a plurality of vacancies.

Advantageous Effects

According to the method of the present disclosure, a coated active material can be produced in a short time.

BRIEF DESCRIPTION OF DRAWINGS

FIG. 2A is a view showing illustrative examples of the shapes of slurry droplets.
FIG. 2B is a view showing illustrative examples of the shapes of slurry droplets.
FIG. 2C is a view showing illustrative examples of the shapes of slurry droplets.
FIG. 3 is a view detailing an aspect of a second step.
FIG. 7 is a view detailing the cross-sectional structure of the coated active material of Comparative Example 1.
FIG. 8 is a view showing BET specific surface area measurement results of the coated active materials of Example 1 and Comparative Example 1.

DETAILED DESCRIPTION

Figure 1:
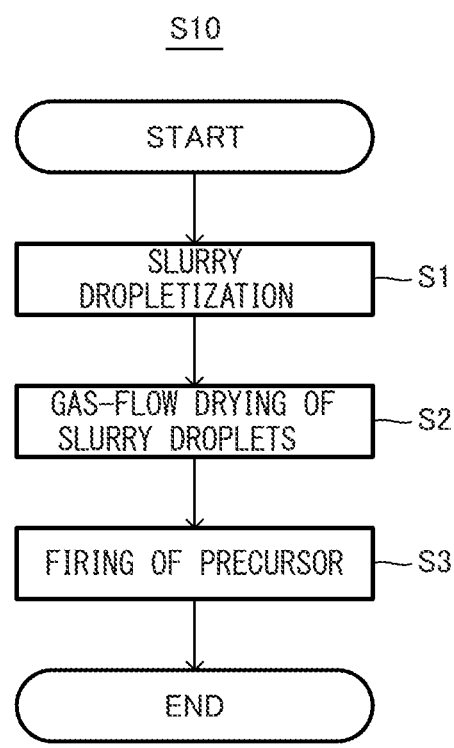
FIG. 1 is a view detailing a method for the production of a coated active material.

The method for producing a coated active material according to embodiments will be described in detail below while referring to the drawings. It should be noted that the method of the present disclosure is not limited to the embodiments below, and various changes can be made within the scope of the spirit of the present disclosure. Furthermore, in the description of the drawings, identical elements have been assigned the same reference sign and duplicate descriptions thereof have been omitted.

1. Method for Production of Coated Active Material

As shown in FIG. 1, the method S10 for producing a coated active material of the present disclosure comprises a first step S1 of dropletizing a slurry to obtain slurry droplets wherein the slurry contains an active material and a coating liquid, a second step S2 of gas-flow drying the slurry droplets in a heating gas to obtain a precursor, and a third step S3 of firing the precursor.

1.1 First Step

In the first step, a slurry containing an active material and a coating liquid is dropletized to obtain slurry droplets.

1.1.1 Active Material

The active material may be a positive electrode active material, or may be a negative electrode active material. Specific examples of the active material include lithium-containing oxides such as $LiCoO_2$, $LiNi_xCo_{1-x}O_2$ ($0<x<1$), $LiNi_{1/3}Co_{1/3}Mn_{1/3}O_2$, $LiMnO_2$, dissimilar-element substituted Li—Mn spinels ($LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, $LiMn_{1.5}Zn_{0.5}O_4$ and etc.), lithium titanates (for example, $Li_4Ti_5O_{12}$), and lithium metal phosphates ($LiFePO_4$, $LiMnPO_4$, $LiCoPO_4$, $LiNiPO_4$ and etc.); various oxide-based active materials other than lithium-containing oxides; Si-based active materials such as Si and Si alloys; carbon-based active materials such as graphite and hard carbon; and metallic lithium and lithium alloys. Among these, substances having a relatively high charge/discharge potential can be used as a positive electrode active material, and substances having a relatively low charge/discharge potential can be used as a negative electrode active material. In particular, when the active material is a lithium-containing oxide, a greater effect can be exhibited by the method of the present disclosure. One type of active material may be used alone, or two or more types may be mixed and used. The active material may be one which is used in sulfide all-solid-state batteries.

The shape of the active material is not particularly limited as long as the slurry can be dropletized. For example, the active material may be in the form of particles. The active material particles may be solid particles or hollow particles. The active material particles may be primary particles or secondary particles in which a plurality of primary particles are aggregated. The average particle diameter (D50) of the active material particles may be, for example, 1 nm or more, 5 nm or more, or 10 nm or more, and may be 500 μm or less, 100 μm or less, 50 μm or less, or 30 μm or less. It should be noted that the average particle diameter D50 is the particle diameter (median size) at an integrated value of 50% in a volume-based particle diameter distribution obtained by the laser diffraction/scattering method.

1.1.2 Coating Liquid

The coating liquid constitutes a coating layer which exerts a predetermined function on the surface of the active material after gas-flow drying and firing, which are described later. The coating layer may, for example, have a function of suppressing an increase in interfacial resistance between the active material and another substance. The type of coating liquid can be selected in accordance with the type of the active material to be coated and the desired function.

When a layer composed of an oxide containing lithium and an element A other than lithium is provided on the surface of the active material, the coating liquid may contain a lithium source and an A source. Specific examples of the element A include at least one selected from the group consisting of B, C, Al, Si, P, S, Ti, Zr, Nb, Mo Ta, and W. For example, when a lithium niobate layer is provided on the surface of the active material, the coating liquid can contain a lithium source and a niobium source. The coating liquid may contain lithium ions as the lithium source. For example, a coating liquid containing lithium ions as a lithium source may be obtained by dissolving a lithium compound such as LiOH, LiNO$_3$, or Li$_2$SO$_4$ in a solvent. Alternatively, the coating liquid may contain a lithium alkoxide as a lithium source. In addition, the coating liquid may contain a niobium peroxo complex as a niobium source. Alternatively, the coating liquid may contain niobium alkoxide as a niobium source. The molar ratio of the lithium source and the niobium source contained in the coating liquid is not particularly limited, and may be, for example, Li:Nb=1:1. Below, (i) a coating liquid containing lithium ions and a niobium peroxo complex, and (ii) a coating liquid containing lithium alkoxide and niobium alkoxide will be illustrated.

(i) Coating Liquid Containing Lithium Ions and Niobium Peroxo Complex

The coating liquid may be obtained, for example, by preparing a transparent solution using, for example, a hydrogen peroxide solution, niobate, and aqueous ammonia, and thereafter adding a lithium compound to the transparent solution. The structural formula of the niobium peroxo complex ([Nb(O$_2$)$_4$]$^{3-}$) is, for example, as follows.

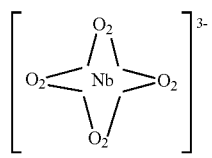

(ii) Coating Liquid Containing Lithium Alkoxide and Niobium Alkoxide

The coating liquid may be obtained, for example, by dissolving ethoxylithium powder in a solvent and then adding a predetermined amount of pentaethoxyniobium thereto. In this case, examples of the solvent include dehydrated ethanol, dehydrated propanol, and dehydrated butanol.

The type of the coating layer provided on the surface of the active material is not limited to a layer composed of an oxide containing lithium and an element A other than lithium. The method of the present disclosure can be adopted when the surface of an active material is modified or coated with some substance. For example, the method of the present disclosure can be adopted even when coating the surface of a positive or negative electrode active material with a transition metal oxide in order to increase the output and life thereof, or when a solid electrolyte such as a sulfide is compounded on the surface of the active material in order to increase the output of the all-solid-state battery. However, it is considered that the method of the present disclosure is particularly effective when a layer composed of an oxide containing lithium and an element A other than lithium is provided on the surface of the active material.

1.1.3 Slurry

The term "slurry" may refer to a suspension or dispersion containing an active material and a coating liquid, and may have a fluidity sufficient to be dropletized. In the method of the present disclosure, the slurry may have a fluidity sufficient to be dropletized using, for example, a spray nozzle or a rotary atomizer. The slurry may contain some solid components or liquid components in addition to the active material and coating liquid described above.

The solid content concentration that can be dropletized can change depending on the type of active material, the type of coating liquid, and the conditions of dropletization (the type of device used for dropletization). The solid concentration in the slurry is not particularly limited and may be, for example, 1 vol % or more, 5 vol % or more, 10 vol % or more, 20 vol % or more, 25 vol % or more, 30 vol % or more, 35 vol % or more, 40 vol % or more, 45 vol % or more, or 50 vol % or more, and may be 70 vol % or less, 65 vol % or less, 60 vol % or less, 55 vol % or less, 50 vol % or less, 45 vol % or less, 40 vol % or less, or 35 vol % or less. From the viewpoint of more easily obtaining slurry droplets, the solid concentration of the slurry may be 40 vol % or less.

1.1.4 Slurry Dropletization

"Dropletization" of the slurry means changing the slurry containing the active material and the coating liquid into droplets containing the active material and the coating liquid.

The method for dropletizing the slurry containing the active material and the coating liquid in the first step is not particularly limited. For example, a method in which the slurry containing the active material and the coating liquid is dropletized by spraying may be used. When the slurry is sprayed, a spray nozzle may be used. Examples of the method of spraying slurry using a spray nozzle include, but are not limited to, a pressurized nozzle method and a two-fluid nozzle method.

When the slurry is sprayed using a spray nozzle, the nozzle diameter is not particularly limited. The nozzle diameter may be, for example, 0.1 mm or more or 1 mm or more, and may be 10 mm or less or 1 mm or less. Furthermore, the spray speed of the slurry (the supply speed of the slurry relative to the spray nozzle) is also not particularly limited. The spray speed may be, for example, 0.1 g/s or more or 1 g/s or more, and may be 5 g/s or less or 0.5 g/s or less. The spray speed may be adjusted in accordance with the viscosity and solid content concentration of the slurry, the nozzle dimensions, etc.

As the method for dropletizing the slurry, in addition to a method of spraying the slurry using a spray nozzle as described above, for example, a method of supplying the slurry containing the active material and the coating liquid onto a rotating disk at a constant speed and dropping it by centrifugal force may also be exemplified. In this case as well, the supply speed of the slurry may be, for example, 0.1 g/s or more or 1 g/s or more, and may be 5 g/s or less or 0.5 g/s or less, and the supply speed may be adjusted in accordance with the viscosity and solid content concentration of the slurry, the nozzle dimensions, etc. Alternatively, a method of applying a high voltage to the surface of the slurry containing the active material and the coating liquid to dropletize the slurry can also be adopted.

In the method of the present disclosure, slurry dropletization (the first step) and gas-flow drying (the second step) may be performed using a spray dryer. The method of the spray dryer is not particularly limited, and examples thereof include the method using a spray nozzle and the method using a rotating disk described above.

1.1.5 Slurry Droplets

"Slurry droplets" are droplets of the slurry containing the active material and the coating liquid. The size of the slurry droplets is not particularly limited. The diameter (spherical equivalent diameter) of the slurry droplets may be, for example, 0.5 μm or more or 5 μm or more, and may be 5000 μm or less or 1000 μm or less. The diameter of the slurry droplets can be measured using, for example, a two-dimensional image obtained by imaging the slurry droplets, or can be measured using a laser diffraction particle diameter distribution meter. Alternatively, the droplet diameter can also be estimated from the operating conditions of the device for forming the slurry droplets.

In the method of the present disclosure, one slurry droplet may contain, for example, one active material particle and the coating liquid attached thereto, or may contain a plurality of active material particles (particle group) and the coating liquid attached thereto. An example of the form of slurry droplets is shown below.

As shown in FIG. 2A, the slurry droplet 11 may contain one active material particle 11a and coating liquid 11b attached thereto, and the coating liquid 11b may cover the entire surface of the active material particle 11a.

As shown in FIG. 2B, the slurry droplet 21 may contain one active material particle 21a and the coating liquid 21b attached thereto, and the coating liquid 21b may cover a part of the surface of the active material particle 21a.

As shown in FIG. 2C, the slurry droplet 31 may contain a plurality of active material particles 31a and the coating liquid 31b attached thereto, and the coating liquid 31b may cover the entirety of the plurality of active material particles 31a or may cover a part thereof.

1.2 Second Step

In the second step, the slurry droplets obtained in the first step are gas-flow dried in a heating gas to obtain a precursor. The term "precursor" refers to a precursor of the target coated active material, and refers to the state prior to the firing process in the third step, which is described later. In the second step, for example, as shown in FIG. 3, the slurry droplet 11 may be gas-flow dried to obtain a precursor 12 in which a layer 11c containing a component derived from the coating liquid is formed on the surface of the active material 11a.

Figure 4A:
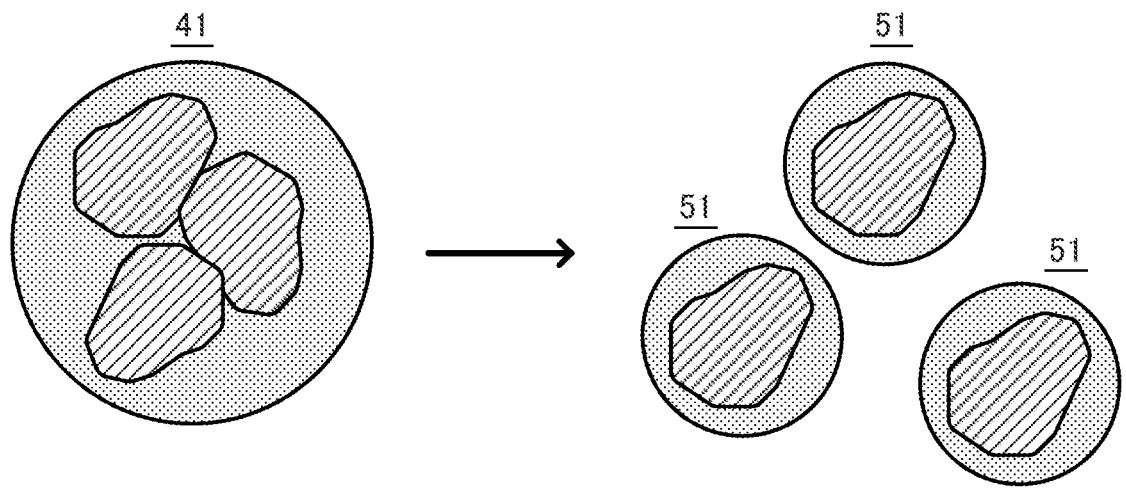
FIG. 4A is a view detailing another aspect of the second step.
Figure 4B:
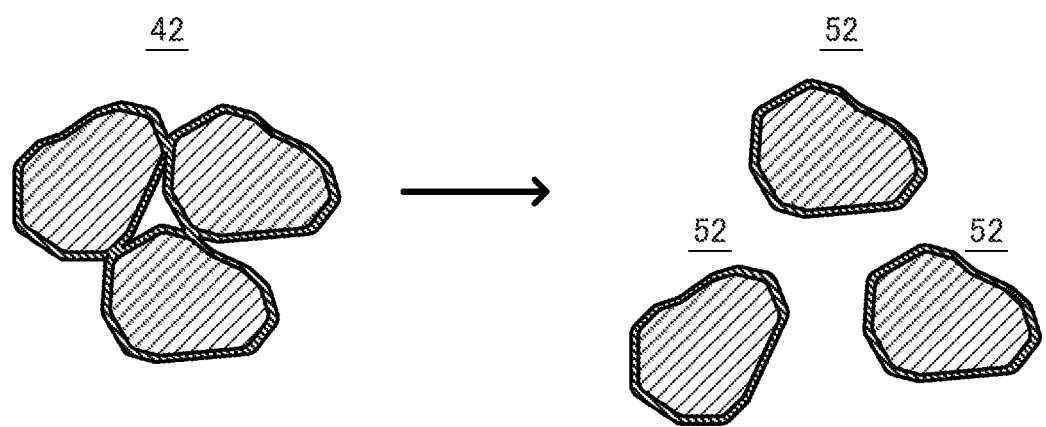
FIG. 4B is a view detailing another aspect of the second step.

In the method of the present disclosure, "gas-flow drying" means that the slurry droplets are dried while being floated in a high-temperature gas flow. "Gas-flow drying" can include not only drying but also ancillary operations using dynamic gas flow. By continuing to apply hot gas to the slurry droplets or precursor by gas-flow drying, the force will continue to be applied to the slurry droplets or precursor. Utilizing this, for example, the second step may include disaggregating (crushing) the slurry droplets and precursor by gas-flow drying. Specifically, as shown in FIG. 4A, when gas-flow drying the slurry droplets, one slurry droplet 41 may be crushed for each active material particle or active material particle group to obtain a plurality of slurry droplets 51, or as shown in FIG. 4B, one aggregated precursor 42 may be crushed for each active material particle or active material particle group to obtain a plurality of precursors 52. In other words, in the method of the present disclosure, even when granules of slurry droplets or precursor are generated, the granules can be crushed by gas-flow drying. Therefore, a slurry having a low solid content concentration can be used, and the processing speed can be easily increased. As described above, in the second step, by crushing the slurry droplets and the precursor by gas-flow drying, the production time can easily be reduced and a coated active material having high performance can easily be produced.

In the second step, the drying and crushing described above may be performed simultaneously, or may be performed separately. In the second step, a first gas-flow drying in which the drying of slurry droplets is predominant and a second gas-flow drying in which the crushing of the precursor is predominant may be performed. Furthermore, the second step may be repeated.

In the second step, the temperature of the heating gas may be any temperature at which the solvent can be volatilized from the slurry droplets. The temperature may be, for example, 100° C. or higher, 110° C. or higher, 120° C. or higher, 130° C. or higher, 140° C. or higher, 150° C. or higher, 160° C. or higher, 170° C. or higher, 180° C. or higher, 190° C. or higher, 200° C. or higher, 210° C. or higher, or 220° C. or higher.

In the second step, the supply amount (flow rate) of the heating gas can be appropriately set in consideration of the size of the device to be used, the supply amount of slurry droplets, etc. For example, the flow rate of the heating gas may be 0.10 $m^3$/min or more, 0.15 $m^3$/min or more, 0.20 $m^3$/min or more, 0.25 $m^3$/min or more, 0.30 $m^3$/min or more, 0.35 $m^3$/min or more, 0.40 $m^3$/min or more, 0.45 $m^3$/min or more, or 0.50 $m^3$/min or more, and may be 5.00 $m^3$/min or less, 4.00 $m^3$/min or less, 3.00 $m^3$/min or less, 2.00 $m^3$/min or less, or 1.00 $m^3$/min or less.

In the second step, the supply speed (flow velocity) of the heating gas can be appropriately set in consideration of the size of the device used, the supply amount of the slurry droplets, etc. For example, the flow velocity of the heating gas may be, in at least part of the system, 1 m/s or more or 5 m/s or more, and may be 50 m/s or less or 10 m/s or less.

In the second step, the treatment time (drying time) by the heating gas can be appropriately set in consideration of the size of the device used, the supply amount of the slurry droplets, etc. For example, the treatment time may be 5 seconds or less or 1 second or less.

In the second step, a heating gas which is substantially inert with respect to the active material and the coating liquid may be used. For example, an oxygen-containing gas such as air, an inert gas such as nitrogen or argon, or dry air having a low dew point can be used. In such a case, the dew point may be −10° C. or lower, −50° C. or lower, or −70° C. or lower.

As the device for performing gas-flow drying, for example, a spray dryer can be used, but the device is not limited thereto.

1.3 Third Step

In the third step, the precursor obtained in the second step is fired. As a result, a coated active material having a coating layer on at least a part of the surface of the active material is obtained.

As the device for firing, for example, a muffle furnace or a hot plate can be used, but the device is not limited thereto.

The firing conditions are not particularly limited and can be appropriately set in accordance with the type of the coated active material. Below, firing conditions in the case of the production of a coated active material having a coating layer containing lithium niobate on the surface of a positive electrode active material are illustrated.

For example, a precursor is obtained by performing the first step and the second step as described above using lithium-containing oxide particles as the positive electrode active material, using a solution containing lithium ions and a niobium peroxo complex as the coating liquid. By firing the obtained precursor, a coating layer containing lithium niobate can be formed on the surface of the lithium-containing oxide, which is the positive electrode active material. In this case, the firing temperature may be, for example, 100° C. or higher, 150° C. or higher, 180° C. or higher, 200° C. or higher, or 230° C. or higher, and may be 350° C. or lower, 300° C. or lower, or 250° C. or lower. The firing temperature in the third step may be higher than the temperature of the gas-flow drying in the second step. The firing time may be, for example, 1 hour or more, 2 hours or more, 3 hours or more, 4 hours or more, 5 hours or more, or 6 hours or more, and may be 20 hours or less, 15 hours or less, or 10 hours or less. The firing atmosphere may be, for example, an air atmosphere, a vacuum atmosphere, a dry air atmosphere, a nitrogen gas atmosphere, or an argon gas atmosphere.

2. Coated Active Material

The coated active material produced by the method of the present disclosure comprises an active material and a coating layer covering at least a part of the surface of the active material. The thickness of the coating layer is not particularly limited and may be, for example, 0.1 nm or more, 0.5 nm or more, or 1 nm or more, and may be 500 nm or less, 300 nm or less, 100 nm or less, 50 nm or less, or 20 nm or less. Furthermore, the coating layer may cover 70% or more or 90% or more of the surface of the active material. It should be noted that the coverage rate of the coating layer on the surface of the active material can be calculated by observation with a scanning electron microscope (SEM) image of the cross section of the particles, or can be calculated by calculating the element ratio of the surface by X-ray photoelectric spectroscopy (XPS).

The particle diameter (D90) of the coated active material is not particularly limited, and may be, for example, 1 nm or more, 10 nm or more, 100 nm or more, 1 μm or more, 2 μm or more, 3 μm or more, 4 μm or more, 5 μm or more, 6 μm or more, 7 μm or more, 8 μm or more, or 9 μm or more, and may be 50 μm or less, 30 μm or less, 20 μm or less, or 10 μm or less. It should be noted that the particle diameter D90 is the particle diameter at an integrated value of 90% in a volume-based particle diameter distribution obtained by the laser diffraction/scattering method.

In the coated active material, the coating layer may have a plurality of vacancies. The vacancies may be, for example, pores, cavities, voids, or gaps. The shape of each vacancy is not particularly limited. For example, the cross-sectional shape of each vacancy may be circular or elliptical. The size of each vacancy is not particularly limited. For example, when observing a cross-section of the coated active material, the circle-equivalent diameter of each vacancy may be 10 nm or more or 300 nm or less. The number of vacancies in the coating layer is also not particularly limited. The positions of the vacancies in the coating layer are not particularly limited, and the vacancies may be present in the interface between the active material and the coating layer, or the vacancies may be present in the coating layer. The coating layer may have a plurality of vacancies contained more inside (active material side) than the outermost surface (the surface opposite to the active material).

In the coated active material, by providing the coating layer with a plurality of vacancies, the following effects can be expected. For example, contact between the coated active material and other battery materials may be advantageous and the movement of electrons and ions may be promoted. Furthermore, cushioning properties are exhibited in the coated active material, which may improve performance during use as an electrode or a battery. For example, it is considered that when the active material expands during charging and discharging, or when pressure is applied to the coated active material during electrode pressing, the above cushioning properties reduce the stresses applied to the active material and suppresses cracking of the active material.

3. Electrode Production Method

The coated active material produced by the method of the present disclosure can be used as the active material for the electrode of an all-solid-state battery. In this regard, the technology of the present disclosure also includes an aspect as an electrode production method. The electrode production method of the present disclosure may comprise: obtaining a coated active material according to the method for the production of a coated active material of the present disclosure described above, mixing the coated active material and a solid electrolyte to obtain an electrode mixture (mixing step), and forming the electrode mixture to obtain an electrode (forming step).

3.1 Mixing Step

In the mixing step, the coated active material and a solid electrolyte are mixed to obtain an electrode mixture. In the mixing step, in addition to the coated active material and the solid electrolyte, a conductive aid and a binder may further be optionally mixed. The content of the coated active material in the electrode mixture is not particularly limited and may be, for example, 40% by mass or more and 99% by mass or less. The coated active material and the solid electrolyte may be mixed in a dry manner, or may be mixed in a wet manner using an organic solvent (for example, a non-polar solvent).

As the solid electrolyte, those which are known as solid electrolytes for all-solid-state batteries may be used. For example, solid oxide electrolytes such as perovskite-type, NASICON-type, or garnet-type Li-containing oxide and sulfide solid electrolytes containing Li and S as constituent elements may be used. In particular, when a sulfide solid electrolyte is used, the technology of the present disclosure can be expected to have a greater effect. Specific examples of sulfide solid electrolytes include, but are not limited to, LiI—LiBr—$Li_3PS_4$, $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$P_2S_5$, and $Li_3PS_4$. The solid electrolyte may be amorphous or crystalline. One type of solid electrolyte may be used alone, or two or more types may be mixed and used.

Specific examples of conductive aids include, but are not limited to, carbon materials such as vapor-phase carbon fibers (VGCF), Acetylene Black (AB), Ketjen Black (KB), carbon nanotubes (CNT), and carbon nanofibers (CNF), as well as metal materials which can withstand the environment when used in an all-solid-state lithium-ion battery. One type of conductive aid may be used alone, or two or more types may be mixed and used.

Specific examples of binders include, but are not limited to, acrylonitrile butadiene rubber (ABR)-based binders, butadiene rubber (BR)-based binders, polyvinylidene fluoride (PVdF)-based binders, styrene-butadiene rubber (SBR)-based binders, and polytetrafluoroethylene (PTFE)-based binders. One type of binder may be used alone, or two or more types may be mixed and used.

3.2 Forming Step

The electrode mixture may be dry- or wet-formed. Furthermore, the electrode mixture may be formed alone or together with a current collector. Further, the electrode mixture may be integrally formed on the surface of a solid electrolyte layer, which is described later. As an example of the forming step, an electrode can be produced by applying a slurry containing the electrode mixture onto the surface of a current collector, and thereafter drying and optionally pressing, or alternatively, an electrode can be produced by placing a powder-like electrode mixture into a mold, and press-molding by a dry method.

4. All-Solid-State Battery Production Method

The technology of the present disclosure also includes an aspect as an all-solid-state battery production method. The all-solid-state battery production method of the present disclosure may comprise: obtaining an electrode by the electrode production method of the present disclosure described above, and laminating the electrode and a solid electrolyte layer.

The solid electrolyte layer may be, for example, a layer containing a solid electrolyte and a binder. The types of the solid electrolyte and the binder are as described above. An all-solid-state battery can be produced through obvious steps such as laminating an electrode and a solid electrolyte layer, connecting a terminal to the electrode, housing the battery in a battery case, and restraining the battery.

EXAMPLES

1. Examples 1 to 3

1.1 Preparation of Coating Liquid 987.4 g of ion exchanged water and 44.2 g of niobic acid ($Nb_2O_5 \cdot 3H_2O$ ($Nb_2O_5$ moisture content: 72%)) were added to a container containing 870.4 g of a hydrogen peroxide solution having a concentration of 30% by mass. Next, 87.9 g of aqueous ammonia having a concentration of 28% by mass was added to the container described above. Then, after the addition of the aqueous ammonia, the contents in the container were sufficiently stirred to obtain a transparent solution. Further, 10.1 g of lithium hydroxide monohydrate ($LiOH \cdot H_2O$) was added to the obtained transparent solution to obtain, as a coating liquid, a complex solution containing a niobium peroxo complex and lithium ions.

1.2 Preparation of Slurry Containing Active Material and Coating Liquid 20 g of $LiNi_{1/3}Mn_{1/3}Co_{1/3}O_2$ (manufactured by Nichia Corporation) as an active material was charged into a mixer container, and was added to the coating liquid adjusted as described above so as to achieve a predetermined solid content concentration, and the mixture was stirred with a magnetic stirrer. The solid content concentration in the coating liquid of the active material of each Example is shown in Table 1 below.

1.3 Production of Precursor of Coated Active Material

Using a liquid feed pump, the slurry of each Example prepared above was supplied to a spray dryer (Mini Spray Dryer B-290 manufactured by BUCHI Corporation) at a speed of 0.5 g/s, and slurry dropletization (first step) and slurry droplet gas-flow drying (second step) were performed to obtain a precursor.

The operating conditions of the spray dryer are as described below.

Gas supply temperature: 200° C.
Gas supply volume: 0.45 m³/min

The time required for delivery of the slurry to the nozzle of the spray dryer and dropletization (dropletization treatment time in the first step) and the gas-flow drying time (gas-flow drying treatment time in the second step) are shown in Table 1 below. Note that the gas-flow drying treatment time means the time from the end of the supply of slurry to the spray nozzle to the end of gas-flow drying.

1.4 Precursor Firing

The precursor was fired at 200° C. for 5 hours using a muffle furnace, and lithium niobate was synthesized on the surface of the active material to obtain the coated active material according to each example.

2. Comparative Example 1

Figure 5:
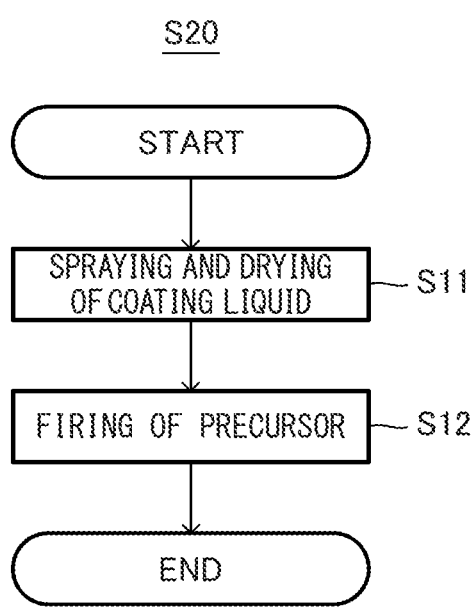
FIG. 5 is a view detailing the production method of Comparative Example 1.

As shown in FIG. 5, 2000 g of the coated liquid prepared as described above was sprayed onto 1 kg of $LiNi_{1/3}Mn_{1/3}Co_{1/3}O_2$ (manufactured by Nichia Corporation) as an active material and dried to obtain a precursor of the coated active material (S11) using a tumbling fluidized bed granulating coating device "MP-01" (manufactured by Powrex Corporation). Firing was performed on the obtained precursor under the same conditions as in the Examples described above (S12), whereby the coated active material according to Comparative Example 1 was obtained.

Note that the operating conditions of the tumbling fluidized bed granulating coating device are as described below.

Atmospheric gas: Dry air with a dew point of −65° C. or less
Air supply temperature: 200° C.
Air supply volume: 0.45 m³/min
Rotor rotation speed: 400 rpm
Spray speed: 4.4 g/min 3. Evaluation Conditions 3.1 Particle Diameter Measurement The particle diameter D90 at an integrated value of 90% in a volume-based particle diameter distribution of the coated active material of each Example and Comparative Example was measured using a laser diffraction/scattering measurement device (Aerotrak II manufactured by MicrotracBEL). The respective measurement results are shown in Table 1 below.

3.2 Battery Output Evaluation 3.2.1 Positive Electrode Production

The coated active material of each Example and Comparative Example 1 and a sulfide solid electrolyte (10LiI-15LiBr-37.5Li₃PS₄) were weighed so as to achieve a volume ratio of 6:4, and these were charged into heptane together with vapor phase carbon fibers (VGCF) (manufactured by Showa Denko) as a 3% by mass conductive aid and butadiene rubber (manufactured by JSR) as a 0.7% by mass binder. Next, these were mixed to produce a positive electrode mixture. The produced positive electrode mixture was sufficiently dispersed with an ultrasonic homogenizer, and thereafter was applied onto an aluminum foil and dried at 100° C. for 30 minutes. A positive electrode was then obtained by punching to a size of 1 cm².

3.2.2 Negative Electrode Production

A negative electrode active material (layered carbon) and a sulfide solid electrolyte (10LiI-15LiBr-37.5Li₃PS₄) were prepared so as to achieve a volume ratio of 6:4, and these were charged into heptane together with butadiene rubber (manufactured by JSR Corporation) as a 1.2% by mass binder. These were then mixed to produce a negative electrode mixture. The prepared negative electrode mixture was sufficiently dispersed with an ultrasonic homogenizer, and thereafter was applied onto a copper foil and dried at 100° C. for 30 minutes. A negative electrode was then obtained by punching to a size of 1 cm².

3.2.3 Solid Electrolyte Layer Production 64.8 mg of a sulfide solid electrolyte (10LiI-15LiBr-37.5Li₃PS₄) was added to a tubular ceramic having an inner diameter cross-sectional area of 1 cm², smoothed, and then pressed at a pressure of 1 ton to form a solid electrolyte layer.

3.2.4 Battery Production

The positive electrode produced as described above was stacked on one surface of the solid electrolyte layer, and the negative electrode produced as described above was stacked on the other surface, and pressed at a pressure of 4.3 tons for 1 minute. Next, stainless steel rods were placed in both poles and restrained at a pressure of 1 ton to obtain an all-solid-state lithium-ion battery according to each Example and Comparative Example 1.

3.2.5 Output Measurement

Regarding the all-solid-state lithium-ion battery of each Example and Comparative Example 1, the open circuit voltage (OCV) was adjusted to 3.66V, and thereafter constant power discharge was performed, and the maximum power value that could be discharged in 5 seconds was measured as the output of the battery. The cutoff voltage was 2.5 V. Using the output of the battery according to Comparative Example 1 as a reference (1.00), the output of the battery according to each Example was relativized and evaluated.

4. Evaluation Results

The evaluation results are shown in Table 1. Note that in Table 1, "total treatment time" means the sum of the "slurry dropletization treatment time (spray time)" and the "gas-flow drying treatment time" in Examples 1 to 3, and in Comparative Example 1, it is the total time of the treatment for spraying while drying the coating liquid onto the active material. The "total treatment speed" is a value obtained by dividing the amount of active material used by the total treatment time.

TABLE 1

| | Active material (g) | Coating Liquid (g) | Slurry Solid Concentration (vol %) | Dropletization Treatment Time (min) | Gas-Flow Drying Treatment Time (min) | Total Treatment Time (min) | Total Treatment Speed (g/min) | Particle Diameter D90 (µm) | Output Ratio |
|---|---|---|---|---|---|---|---|---|---|
| Ex 1 | 20 | 24 | 15.3 | <1 | <1 | <2 | >10 | 9.45 | 1.01 |
| Ex 2 | 20 | 43 | 9.2 | <1 | <1 | <2 | >10 | 9.48 | 1.00 |
| Ex 3 | 20 | 64 | 6.4 | <1 | <1 | <2 | >10 | 9.41 | 1.04 |
| Comp Ex 1 | 1000 | 2000 | — | — | — | 444 | 2.3 | 9.50 | 1.00 |

In tumbling fluidized bed coating, as in Comparative Example 1, when the spray rate of the coating liquid is high, liquid cross-linking produces granules. Furthermore, in tumbling fluidized bed coating, the action of disaggregating the particles at the time of drying is weak, and once a granulated material is generated, it is difficult to disaggregate the particles. Therefore, in tumbling fluidized bed coating, the spray rate must be reduced in order to avoid the granulation of particles. In the prior art, as in Comparative Example 1, 2000 g of coating liquid is supplied at a rate of 4.4 g/min, and the liquid supply time reaches 444 minutes. Conversely, as shown in Table 1, it can be seen that according to the production methods of Examples 1 to 3, the coated active material can be produced in a shorter time than the production method of Comparative Example 1. In Examples 1 to 3, even when granules of slurry droplets or precursors were generated, the granules could be crushed by gas-flow drying. Thus, a slurry having a low solid content concentration can be used, whereby processing speed can easily be increased. In other words, treatment can be carried out at higher speeds than the conditions described above. It can also be seen that the outputs of the all-solid-state lithium-ion batteries using the coated active material produced in Examples 1 to 3 were substantially the same as that of Comparative Example 1 or was superior to that of Comparative Example 1. For example, in Examples 1 to 3, since the granulated material can be crushed by gas-flow drying as described above, a coated active material having a small particle size can be obtained even when the treatment speed is increased.

Figure 6:
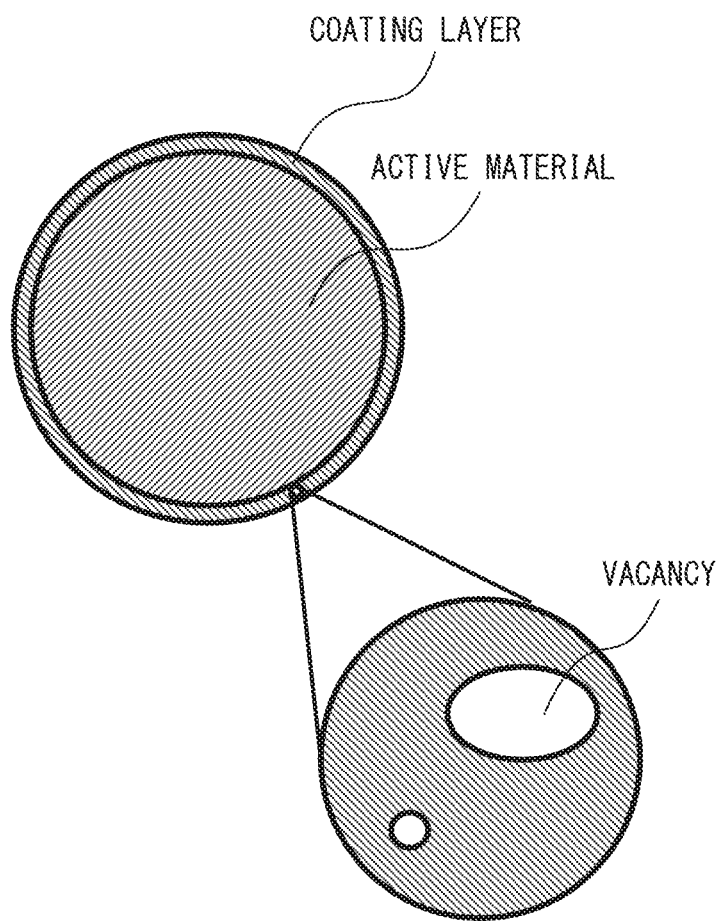
FIG. 6 is a view detailing the cross-sectional structure of the coated active material of Example 1.

5. Structure and Physical Property Evaluation of Coated Active Material 5.1 SEM Observation FIG. 6 schematically shows the cross-sectional structure of the coated active material of Example 1. Further, FIG. 7 schematically shows the cross-sectional structure of the coated active material of Comparative Example 1. FIGS. 6 and 7 are abstractions of cross-sectional structures based on cross-sectional SEM images of the coated active materials of Example 1 and Comparative Example 1. As shown in FIG. 6, the coated active material of Example 1 had an active material and a coating layer covering at least a part of the surface of the active material, and the coating layer had a plurality of vacancies. Vacancies were present in the interface between the active material and the coating layer and in the interior of the coating layer. In connection thereto, as shown in FIG. 7, in the coating active material of Comparative Example 1, vacancies could not be confirmed in the coating layer. In the coated active material of Example 1, the plurality of vacancies had elliptical or circular cross-sectional shapes. Further, when a cross-section of the coated active material of Example 1 was observed, the coating layer had a plurality of vacancies having a circle-equivalent diameter of 10 nm to 300 nm. Furthermore, in the coated active material of Example 1, the coating layer had a thickness of 0.1 nm to 300 nm, and covered 70% or more of the surface of the active material.

In Example 1, substantially simultaneous desorption of components contained in the slurry (coating material solution and active material) and formation of a film were caused by rapid drying, which is a feature of the spray dryer. Specifically, since the shape of the film changes significantly under the influence of the physical force received when the components are desorbed, and the film hardens under such influence, it is considered that the plurality of vacancies are formed in the coating layer as described above. This phenomenon is considered to occur even if the type of coating liquid contained in the slurry is changed, but in particular, it is expected to occur predominantly when a low boiling point solvent such as water (solvent accompanied by rapid vaporization in the drying process) is used.

When there are a plurality of vacancies in the coating layer, as in the Examples described above, it is expected that the contact with other battery materials will be improved, the conduction of electrons or ions will be promoted, and the battery performance will be improved by providing the coating layer with cushioning properties. For example, even when the active material expands during charging and discharging, or when pressure is applied to the coated active material during electrode pressing, the above cushioning properties can be expected to bring about the effects of reducing the stresses applied to the active material and suppressing cracking of the active material.

5.2 BET Specific Surface Area

FIG. 8 shows the BET specific surface area measurement results of the coated active materials of Example 1 and Comparative Example 1. As shown in FIG. 8, the BET specific surface area of the coated active material of Example 1 is greater than the BET specific surface area of the coated active material of Comparative Example 1. As described above, it is considered that the coated active material of Example 1 has a large specific surface area due to the formation of vacancies and gaps in the coating layer due to rapid-drying with a spray dryer.

REFERENCE SIGNS LIST

11$a$, 21$a$, 31$a$ active material
11$b$, 21$b$, 31$b$ coating liquid
11, 21, 31, 41, 51 slurry droplets
42, 52 precursor

What is claimed is:

1. A method for producing a coated active material, the method comprising:
   dropletizing a slurry by spraying the slurry to obtain slurry droplets wherein the slurry contains an active material and a coating liquid,
   gas-flow drying the slurry droplets in a heating gas to obtain a precursor, wherein a temperature of the heating gas is between 180° C. and 220° C., and wherein the slurry droplets are disaggregated by the gas-flow drying to obtain a plurality of slurry droplets and the precursor is disaggregated by the gas-flow drying to obtain a plurality of precursors, and
   firing the plurality of precursors to obtain the coated active material comprising the active material and a coating layer covering at least a part of a surface of the active material,
   wherein the gas-flow drying comprises a first gas-flow drying in which drying of the slurry droplets is predominant and a second gas-flow drying in which disaggregating of the precursor is predominant,
   wherein the coating layer has a plurality of vacancies,
   wherein the plurality of vacancies are present in an interface between the active material and the coating layer and in an interior of the coating layer.

2. The method according to claim 1, wherein the coating liquid contains a lithium source and a niobium source.

3. The method according to claim 2, wherein the niobium source contains a niobium peroxo complex.

* * * * *